US010663328B2

(12) United States Patent
Steinich

(10) Patent No.: US 10,663,328 B2
(45) Date of Patent: May 26, 2020

(54) ELECTRICAL COMPONENT, IN PARTICULAR SENSOR, AS WELL AS MANUFACTURING METHODS THEREFOR

(71) Applicant: ASM Automation Sensorik Messtechnik GmbH, Moosinning (DE)

(72) Inventor: Klaus Manfred Steinich, Zorneding / Pöring (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 477 days.

(21) Appl. No.: 15/405,641

(22) Filed: Jan. 13, 2017

(65) Prior Publication Data

US 2017/0199062 A1 Jul. 13, 2017

(30) Foreign Application Priority Data

Jan. 13, 2016 (DE) .................. 10 2016 100 479

(51) Int. Cl.
*G01D 11/26* (2006.01)
*G01D 5/14* (2006.01)
*G01D 11/24* (2006.01)

(52) U.S. Cl.
CPC .............. *G01D 11/26* (2013.01); *G01D 5/14* (2013.01); *G01D 11/245* (2013.01)

(58) Field of Classification Search
None
See application file for complete search history.

(56) References Cited

U.S. PATENT DOCUMENTS

| 5,057,348 A * | 10/1991 | Drain ..................... B29C 35/02 174/521 |
| 5,719,334 A * | 2/1998 | Parsons ................... G01P 1/023 73/514.01 |
| 6,583,355 B2 | 6/2003 | Skrzypchak |
| 2008/0164866 A1* | 7/2008 | Steinich ................... G01D 5/08 324/207.2 |
| 2009/0079423 A1* | 3/2009 | Steinich ................... G01B 7/30 324/207.25 |
| 2012/0001623 A1* | 1/2012 | Steinich ............... G01D 11/245 324/207.25 |
| 2015/0342071 A1 | 11/2015 | Mijac et al. |

FOREIGN PATENT DOCUMENTS

| CN | 204885619 | 12/2015 |
| DE | 102010036910 | 2/2012 |
| DE | 102014007443 | 11/2015 |

* cited by examiner

*Primary Examiner* — Nasima Monsur
(74) *Attorney, Agent, or Firm* — Head, Johnson, Kachigian & Wilkinson, PC

(57) ABSTRACT

In order to minimize a force transfer at electronic components (1), in particular sensors (1) whose electronic circuit in an interior of a housing (2) is encased by an initially liquid or highly viscous hardening encasement compound (20) at an increasing temperature from the hardened encasement compound to the electronic components (4, 24) it is proposed according to the invention to perform the encasement so that in the cured condition all required portions and components (4, 24) are covered by the encasement compound (20) but sufficient cavities (21.1, 22.2) remain in the interior spaces (14.1, 14.2) of the housing (2) so that the hardened encasement compound (20) can expand into the cavities.

20 Claims, 12 Drawing Sheets

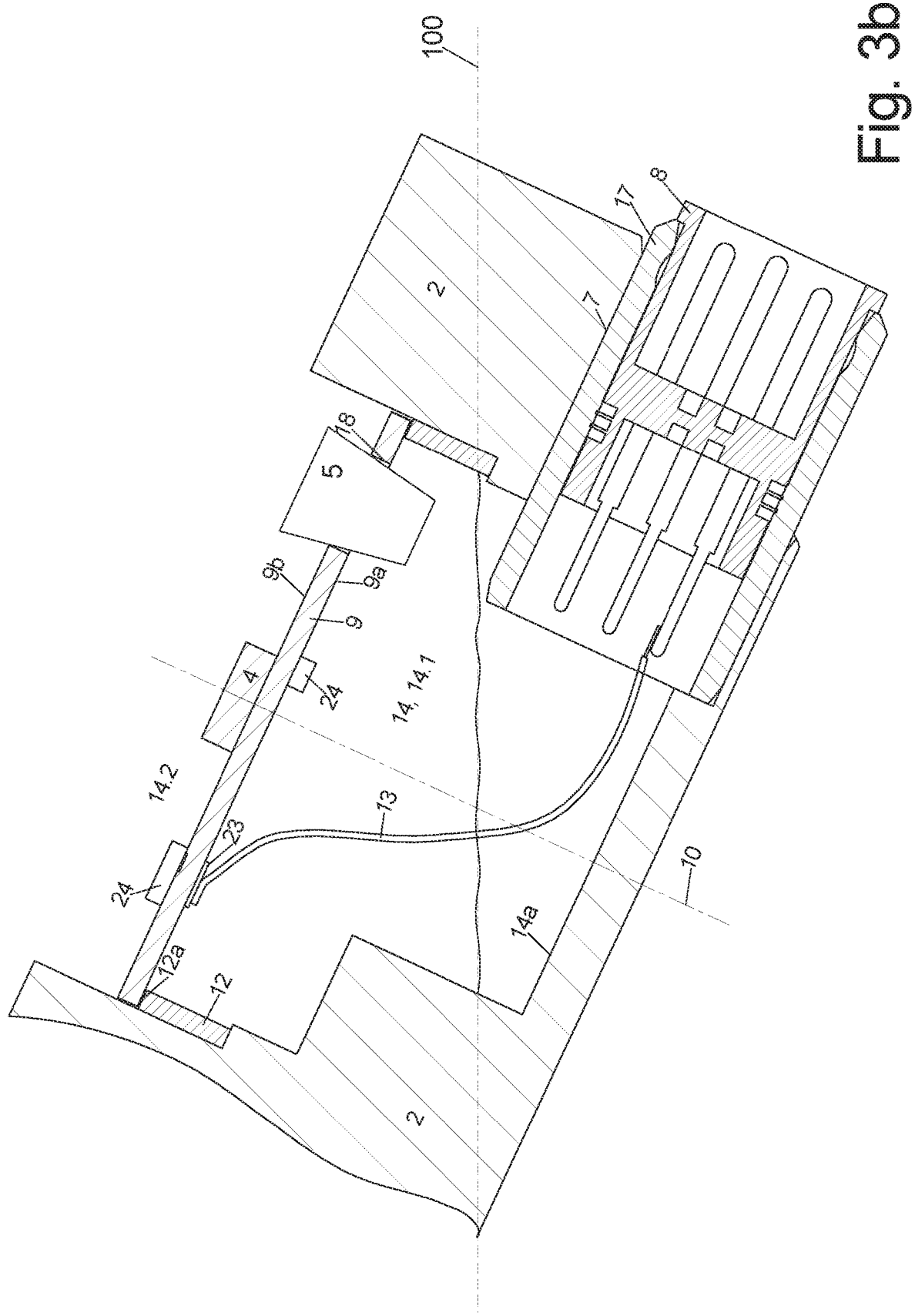

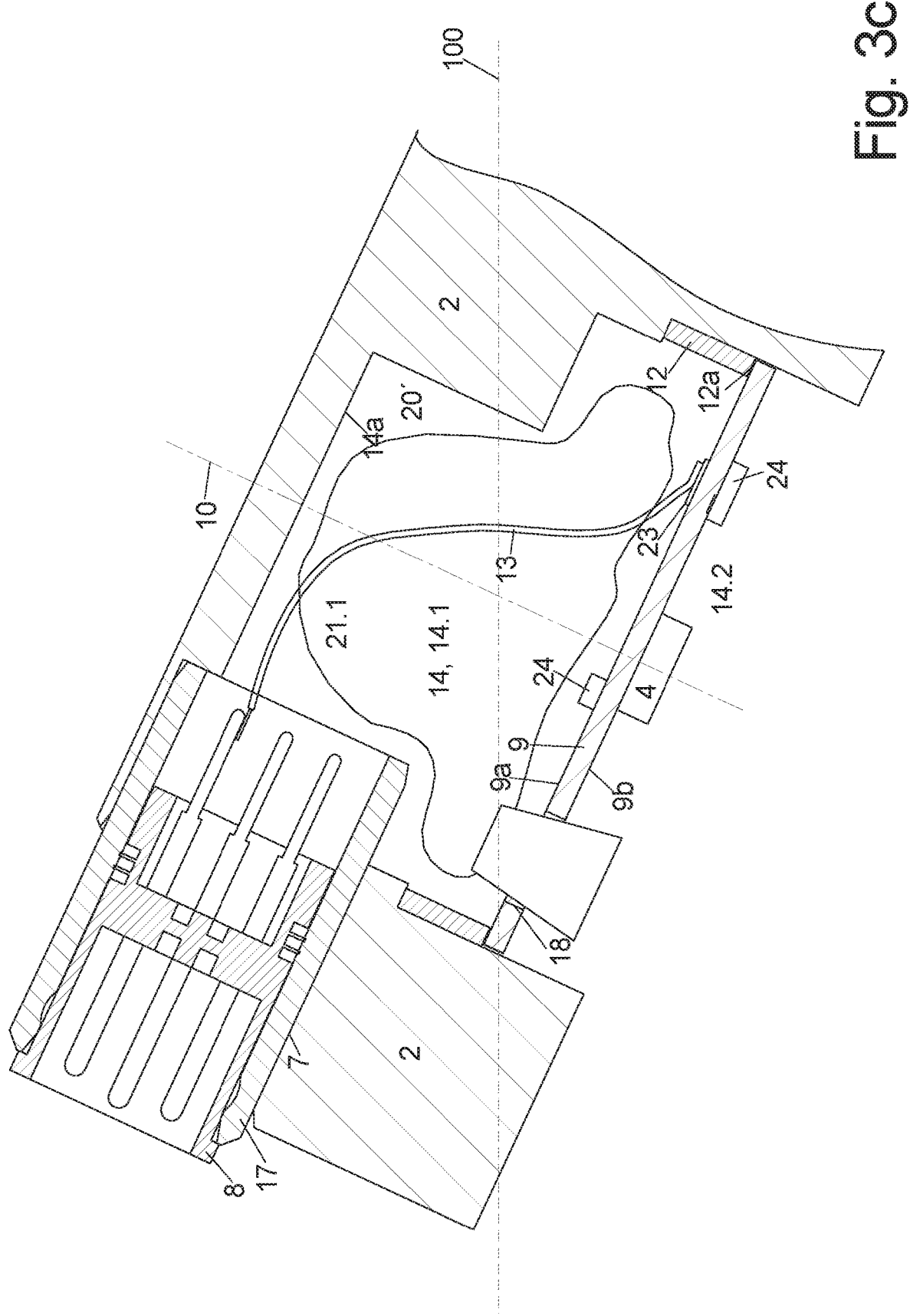

Figure 1A:
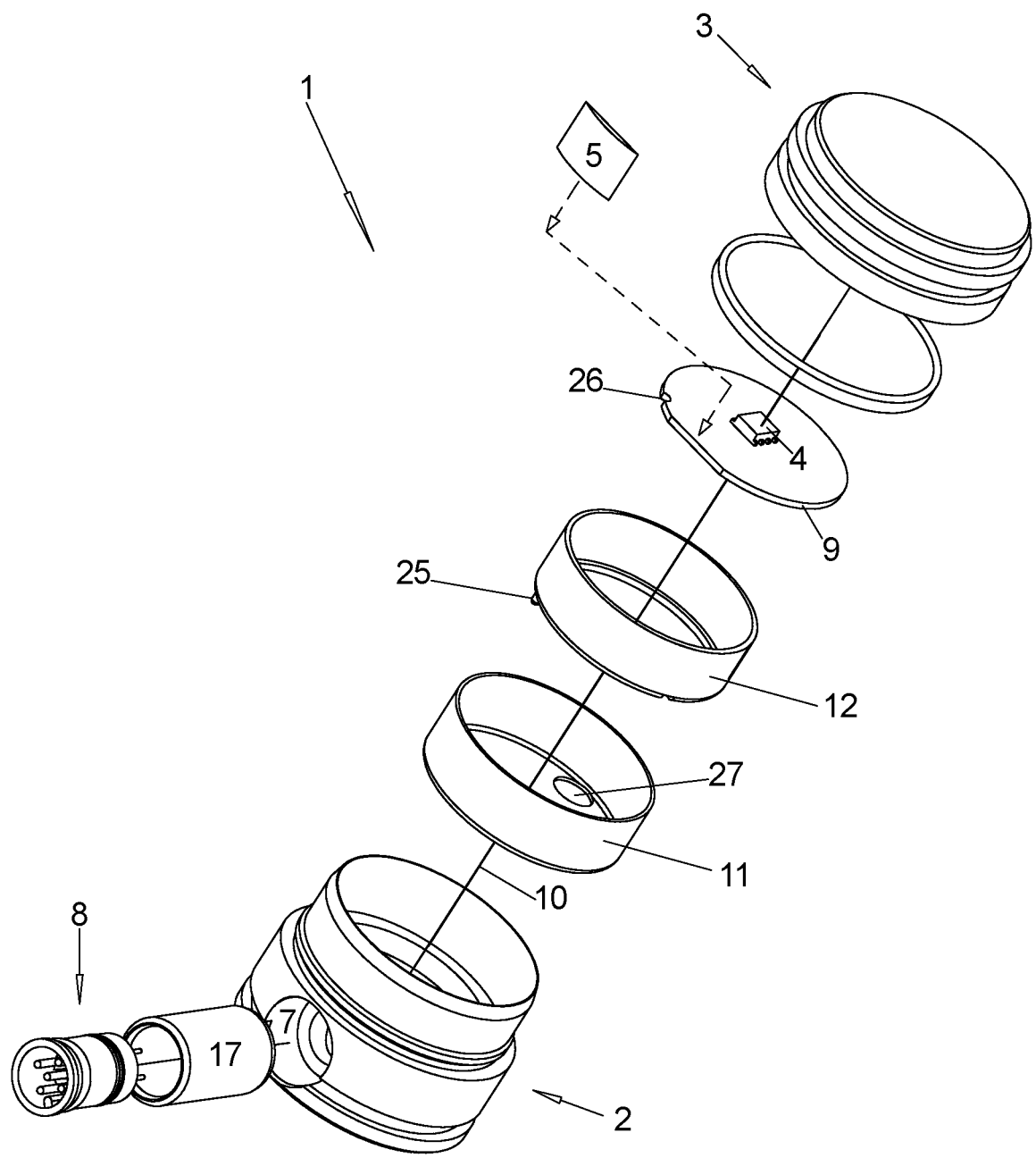

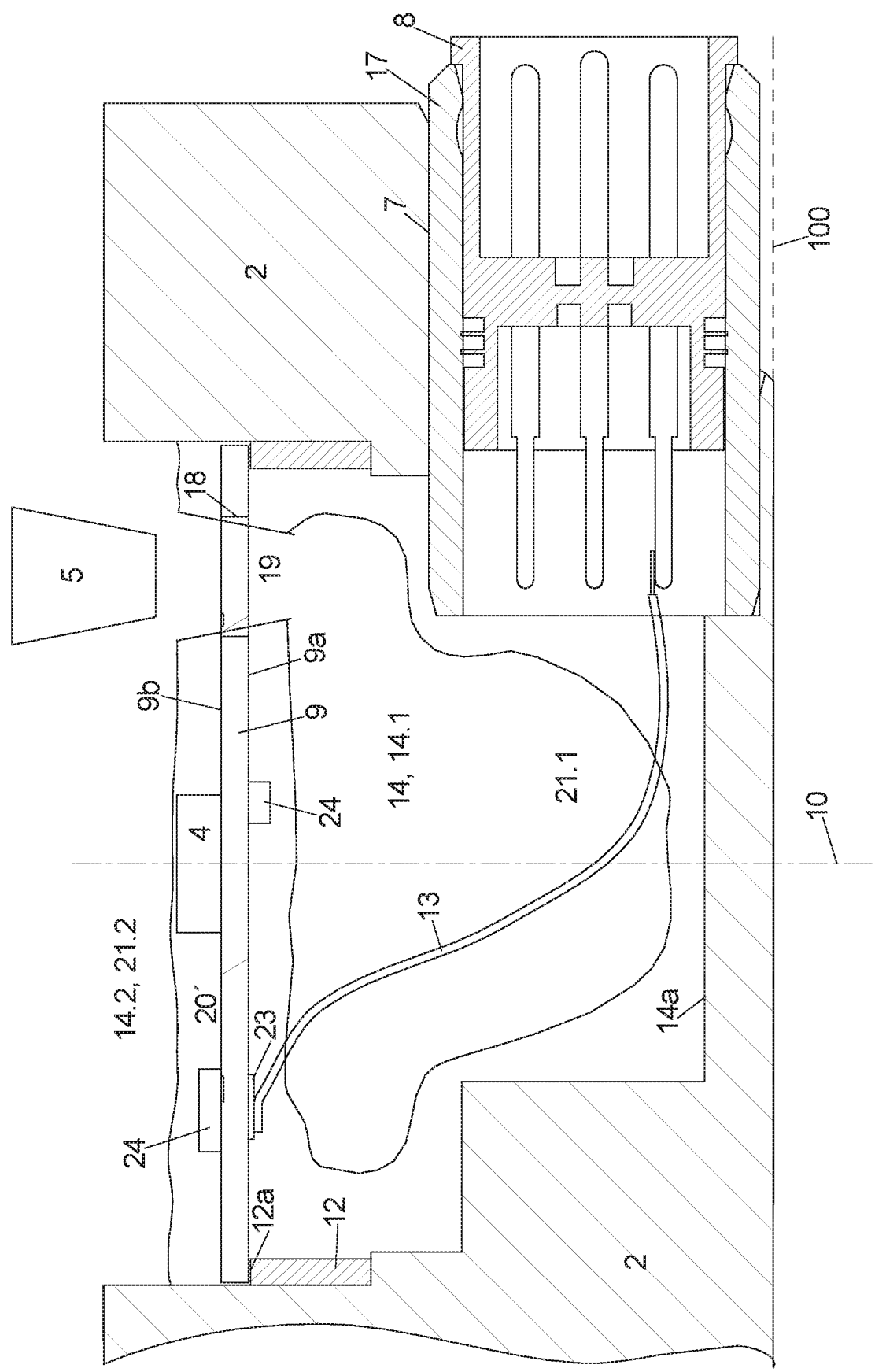
Fig. 3e1

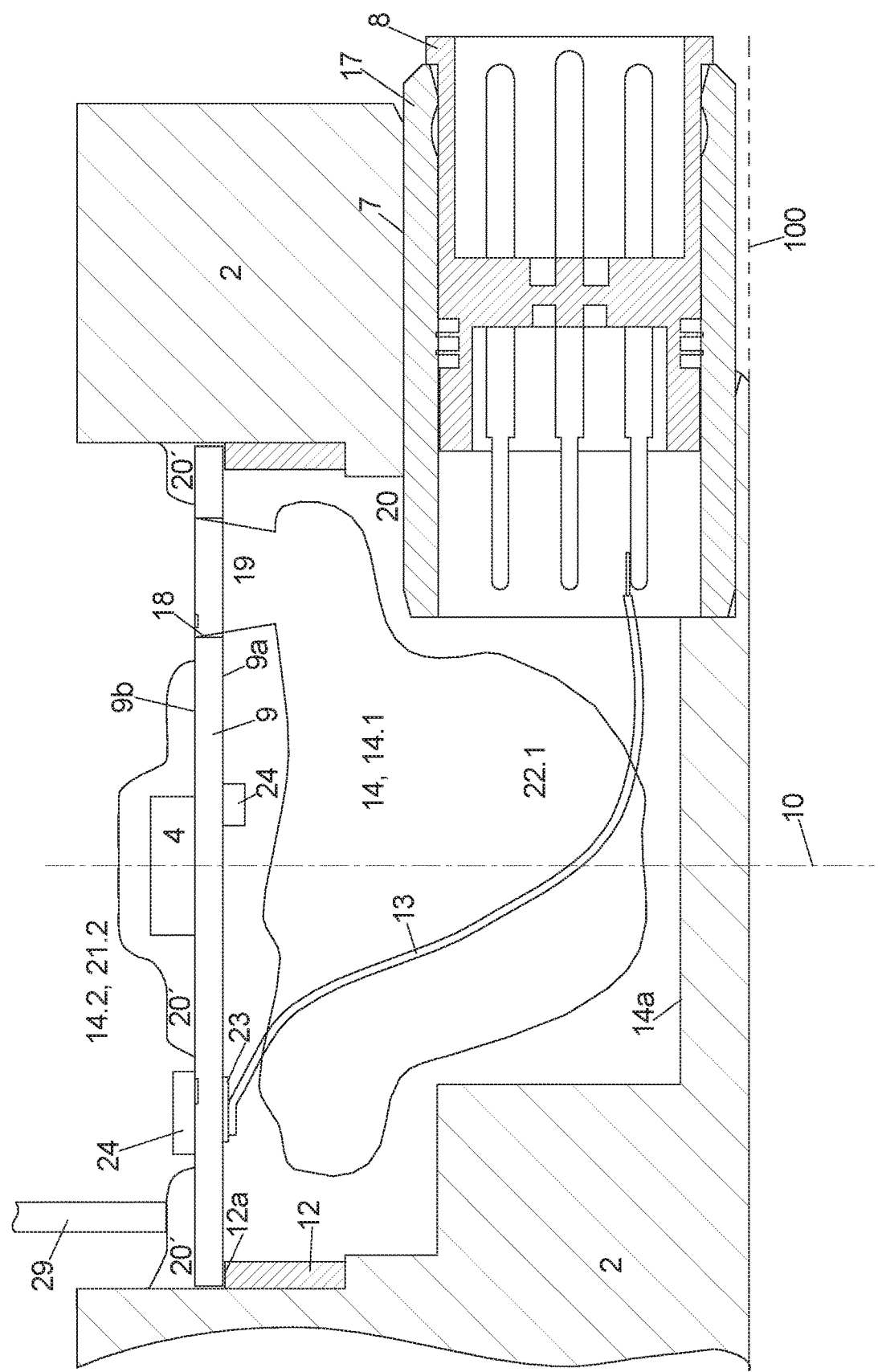

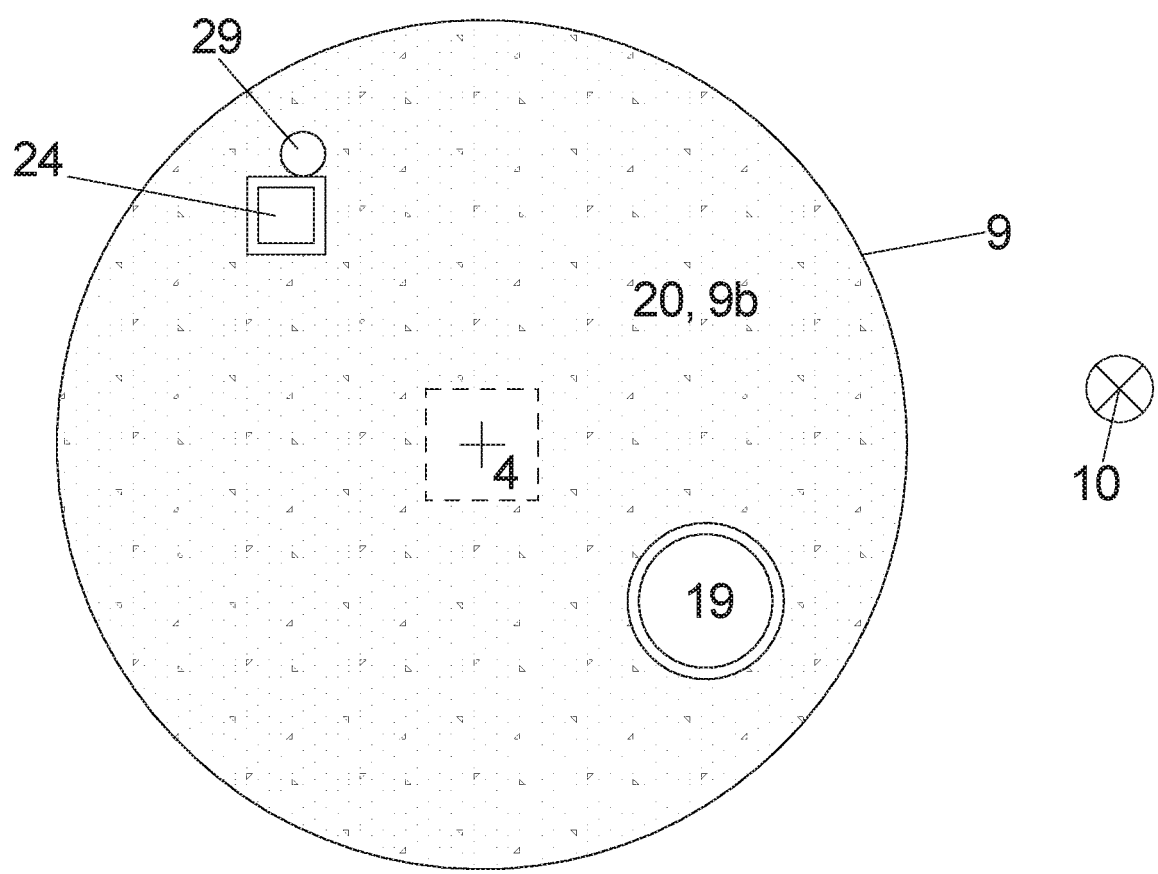
Fig. 3e3

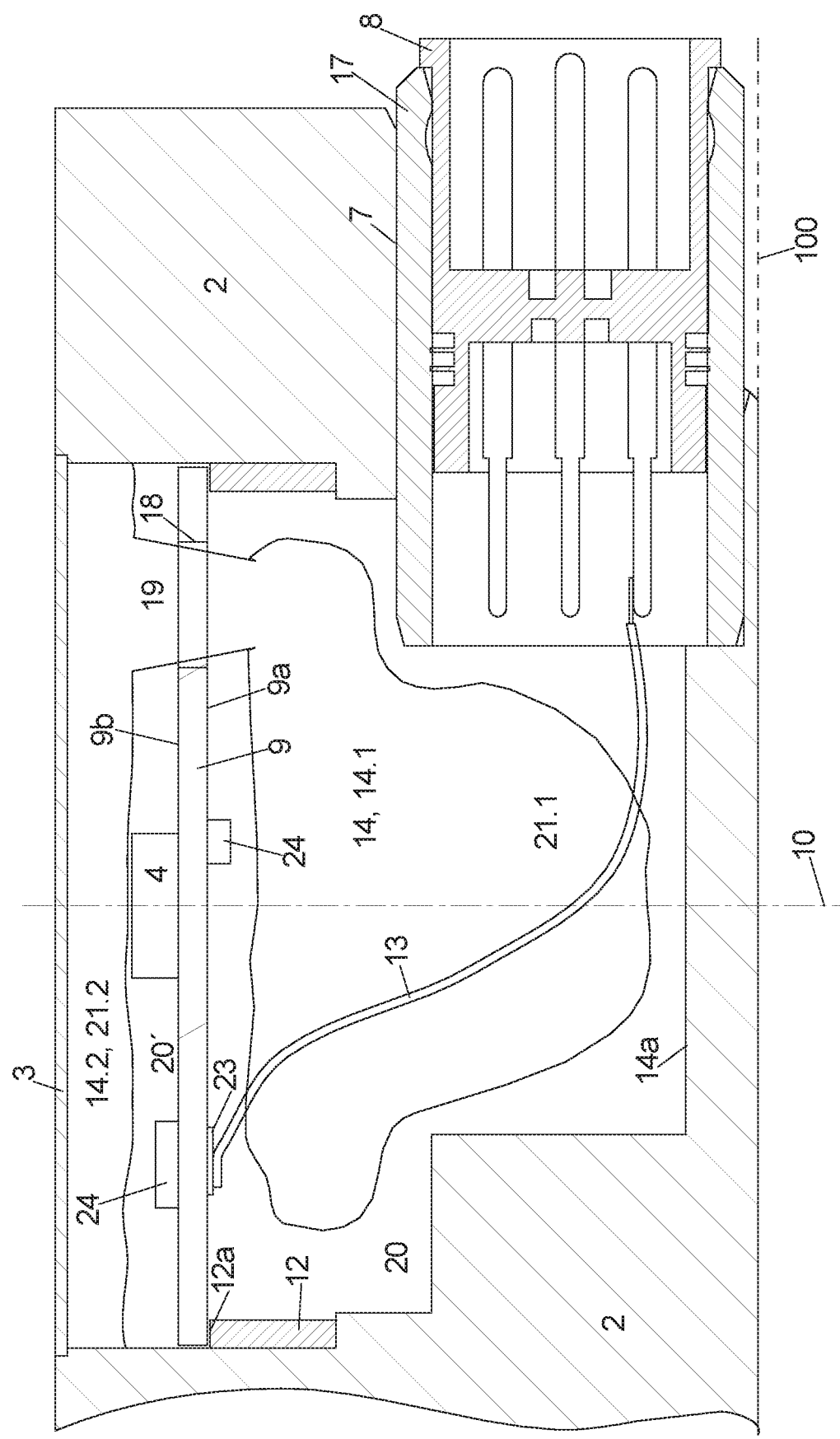

ELECTRICAL COMPONENT, IN PARTICULAR SENSOR, AS WELL AS MANUFACTURING METHODS THEREFOR

I. FIELD ON THE INVENTION

The invention relates to an electrical components for example sensors, in particular angle sensors or inclination sensors where an electronic circuit board is arranged in a housing that is liquid tight over a long time period, wherein the printed circuit board includes for example a sensor element in order to detect a particular parameter, e.g. strength of direction of a magnetic field advantageously touch free. In the context of the instant application a sensor is recited without limiting the electrical components on an electronic circuit board in an interior of a housing to sensors.

II. BACKGROUND OF THE INVENTION

One embodiment of an electrical component configured as a sensor is a magnetic field sensitive angle sensor, whose sensor element typically includes an integrated electronic circuit configured as an electronic chip which is soldered into a printed circuit board which typically includes additional electronic components e.g. configured as a processing circuit.

Typically a cable leads out of the housing through a pass through opening wherein the free insulation stripped ends of cable strands are sauntered with the processing onto the circuit board or a plug in jack is integrated in the pass through of the wall of the housing wherein externally accessible electrical contacts in an interior of the housing are connected with the processing circuit through individual strands of a conductive electrical cable.

Thus it is well known to configure the housing with a long term seal in that advantageously not only housing elements are bolted together with a seal arranged there between but the housing forms a welded or glued unit in that for example a cover is placed on a pot shaped housing and laser welded.

It is another protective measure to encase the electronic components including the chip in the interior of the housing with a hardening encasement compound before closing the housing, thus to cover the electronic components by covering the entire circuit board with the curing encasement compound.

Since conductive paths or at least soldering spots for soldering the outgoing cable or the outgoing strands of a cable at a bottom side of the circuit board which for this reason is mounted at a distance from the base of the pot shaped interior space at least a bottom side of the circuit board has to be encased at the provided electrical portions and components and also all additional exposed portions of electrical conductors thus the strand ends or when using a plug in jack the soldered joints between the exposed ends of the strands and the plug in jack.

Thus, it is typically required to encase a lower interior space below the circuit board and also an upper interior space above the circuit board with a hardening encasement compound before closing the housing.

In some applications an additional application of a cover is omitted since the lower interior space as well as the upper interior space is completely filled with the encasement compound so that the hardened encasement compound arranged above the printed circuit board represents the only protection for the electronic components relative to an outside.

It is appreciated that the enveloping housing has to have sufficient stability for an intended application in order to withstand loads that are applied from an outside, for example through the attachment of the housing at an adjacent component.

However it has become evident that the encased electronics can be damaged or destroyed even when the interior space of the sensor housing is completely encased, in particular when there are very high temperature variations.

Presumably these problems are caused by the temperature expansion of the hardened encasement compound which differs from a temperature expansion of the enveloping housing at least time based. In particular when the housing is closed tight by a cover that is additionally applied an expansion of the cured encasement compound which completely fills the interior space in parts considerable mechanical loads upon the electronic circuit so that for example even solder joints between an electronic component and the circuit board can tear off.

III. DETAILED DESCRIPTION OF THE INVENTION a) Technical Object

Thus it is an object of the invention to provide a sensor and a production method which overcomes the recited problems.

b) Solution

This object is achieved by the features of the claims 1 and 9. Advantageous embodiments can be derived from the dependent claims.

Thus it is a basic idea of the instant invention that sufficient cavities have to be provided in an interior of a closed housing that is encased with a hardened encasement compound so that the hardened encasement compound can expand into the cavities when a temperature induced expansion occurs. In particular only an amount of encasement compound shall be used that suffices to cover all components that need protection, in particular electronic components and electrical conductive components.

The known method for producing a sensor of this type includes applying the circuit board to a support in an interior space of the pot shaped housing at a distance from a base of the housing wherein the circuit board includes a sensor element arranged thereon and optionally additional components and advantageously strands that are already attached at the printed circuit board and that lead away from the printed circuit board and filling a curable not yet curing liquid or pasty encasement compound into the interior space of the housing with the printed circuit board arranged therein before applying and closing the cover so that the lower interior space is filled completely and the upper interior space is also filled completely through a pass through opening between the upper and lower interior space.

Thus there is no cavity left in the subsequently closed housing or at the most a small cavity between a top side of the encasement compound arranged in the upper interior space and the cover since the housing is arranged with an upper open side of the pot shaped housing oriented in upward direction when this known procedure is used and is also left this way after applying the closing the cover until the encasement compound is hardened so that the encasement compound penetrates downward in the cavities of the housing and fills all the cavities.

According to the invention the process of filling in the encasement compound is performed differently so that all intended components and portions, in particular all electrically conductive services on and at the circuit board are covered with the encasement compound after the encasement compound is hardened.

Thus it is appreciated that after hardening the encasement compound a connection shall be provided through a connection opening between the lower cavity formed in the completed sensor in the lower interior space and the upper cavity formed in the upper interior space in order to permit an air exchange with respect to pressure and/or temperature between the two cavities which forms a cavity that is larger in total which is an advantage for a long service life of the sensor.

Thus the encasement process is performed as follows.

Initially the lower interior space is encased.

For this purpose the housing is supported so that the liquid or pasty encasement compound is introduce able into the lower interior space through a fill in opening connecting the lower interior space and the upper interior space wherein the fill in opening can extend through the circuit board or between the outer edge of the circuit board and the interior circumferential wall of the pot shaped housing.

It is appreciated that gas that is displaced from the lower interior space by filling in the encasement compound, typically the gas is air has to be allowed to exit from the lower interior space and upward direction either through an additional opening beyond the fill in opening which can also extend through the circuit board or through a gap between the circuit board and the surrounding housing or in that the fill in opening is not completely closed but only partly closed by the fill in nozzle during filling.

This certainly works best when the lower interior space is arranged below the circuit board and the circuit board and the base of the housing advantageously extend horizontally with the circuit board arranged above the base.

However, when the base and/or the circuit board are arranged at a slant angle this is possible as long as the fill in opening is arranged sufficiently far above the lowest point of the lower interior space in this encasement position for the lower interior space.

Theoretically the lower interior space could be arranged parallel and vertically extending between the vertically extending base of the housing and the circuit board or even partially above the circuit board as long as only filling a sufficient amount of encasement compound through the fill in opening is then possible still.

Thus only a much smaller volume of encasement compound is introduced compared to the volume of the lower interior space, namely just the right amount of volume to cover all surfaces with the encasement compound that need covering in the lower interior space, in particular with the predetermined layer thickness, e.g. 0.5-3 mm, in particular 1-2 mm. Thus soldering pads that may be provided at the bottom side of the circuit board or other attachment devices at which the stripped strand ends of the strands leading away from the circuit board are soldered or the entire bottom side of the circuit board, at least all electronic components and/or soldering spots at which the strands run from the circuit board are soldered at a plug in socket that is inserted seal tight in the pass through of the housing.

After introducing the predetermined volume of encasement compound into the lower interior space the housing is supported in a first adhesion, advantageously the previously described fill in position for a predetermined first time period in order to make the encasement compound depending on its viscosity, temperature and other parameters adhere at the wetted surfaces. In this first adhesion position advantageously only the fill in opening shall not be reached by the encasement compound.

After the first time period has expired, in particular directly thereafter the housing is rotated about a horizontal axis but not necessarily by 180°.

Thus, when the base of the housing in the fill in position or in the first adhesion position extends horizontally below the horizontally extending circuit board the base of the housing is now above the circuit board and extends horizontally and parallel thereto. Thus the portion of the encasement compound that does not adhere directly at a surface and which is still liquid or pasty of the encasement compound that has now higher viscosity as a function of gravity runs downward and thus additionally wets other portions of the lower interior space and after a rotation by 180° wets the opposite portions.

Also in the second adhesion position the housing is retained for a predetermined second time period.

When the rotation by less than 180° has been performed this second adhesion position has to be followed at least by a third adhesion position advantageously after additional rotations until all portions in the interior of the lower interior space that are to be covered by the encasement compound, in particular the interior circumferential surfaces are completely covered by the encasement compound so that the encasement compound adheres to the interior surfaces and cures and does not disengage from the circumferential surfaces anymore.

When the method is to be performed with only two adhesion positions the filled in volume of encasement compound has to amount to more than 40%, better more than 50%, better between 50% and 80%, better between 50% and 65% of the volume of the cavity, in particular of the lower cavity. The lower the volume of the filled in encasement compound compared to the volume of the interior cavity to be encased, in particular the lower cavity, the more adhesion positions are required that differ with respect to their angular orientation.

In this second adhesion position and optionally in additional adhesion positions the still liquid or pasty encasement compound in the lower interior space will also reach the fill in opening.

In order for the encasement compound not to flow out of the lower interior cavity into the upper interior cavity either an increase in viscosity of the encasement compound as a function of a size of the fill in opening and the elapsed adhesion time have to selected so that the more viscous encasement compound cannot pass through the fill in opening anymore.

or the fill in opening has to be closed with a plug before reaching an adhesion position where the encasement compound reaches the fill in opening.

The same applies certainly for all additional connections openings that may be provided between the lower interior space and the upper interior space.

Instead of sequentially assuming defined rotation positions over a predetermined time frame after introducing the encasement compound into the lower interior space and optionally closing the fill in opening and all additional connection openings the housing can also be permanently rotated about a horizontal axis or other pivot movements can be performed with the housing so that all interior circumferential walls of the lower interior space are covered with the increasingly adhering or even hardening encasement compound after a time period, in particular as a function of the rotation or pivot movements of the housing that need to be performed, however within this advantageously closed circumferential layer of encasement compound which forms a hollow element in cured condition so that an interior cavity remains into which the cured encasement compound can expand when the sensor warms up.

After the lower interior space is encased in this manner the upper interior space is encased which is still open towards the opening of the housing.

The upper interior space shall not be filled completely either but a much lesser volume amount of encasement compound is introduced, then the volume of the upper interior space, but at least the amount so that all components that are to be protected by the encasement compound, advantageously all electrical or electronic components arranged at a top side of the circuit board, all conductive paths and all soldering spots are encased thus completely covered by the encasement compound. Advantageously also a transition between the edge of the circuit board and the insides of the walls of the housing shall be completely wetted by the encasement compound.

For this purpose the encasement compound is introduced into the upper interior space in a refill position of the housing so that the encasement compound does not reach the upper edge of the upper interior space of the housing. Subsequently the housing is supported over a second predetermined time period in another hardening position, stationary or not, so that the level of the circuit board only deviates from the horizontal plane by a small amount so that all desired portions, in particular all electronic components, all conductive paths and all soldering points on the top side of the circuit board are wetted by the encasement compound and on the other hand side the encasement compound cannot run out of the upper opening of the pot shaped housing and cannot even reach this opening.

During refilling and also during subsequent adhesion all openings, the fill in opening or additional openings between the upper and the lower cavity remain closed, advantageously when closure is performed by a plug, the plug however protrudes beyond the hardened encasement compound arranged in the upper cavity. Care should also be taken when refilling the encasement compound into the upper cavity that a top side of this plug is not covered with the encasement compound.

After curing the encasement compound in the upper interior cavity an upper cavity is generated in the upper interior space after applying and closing the cover, namely between a top side of the cured encasement compound in the upper interior space and the bottom side of the cover.

Before closing the housing by applying the cover plugs that are still inserted into the fill in opening and/or additional connection openings have to be removed in order to establish a connection between the upper interior space and the lower interior space.

This at least one plug for this purpose certainly has to protrude from the respective opening far enough in both directions so that it is not completely covered by the layer of encasement compound in the respective interior space after curing.

In case no plugs were provided typically the original fill in opening as well as additional provided fill in openings of encasement compound are closed, in particular by the encasement compound filled into the upper interior space.

Applying the encasement compound in the upper interior space by introducing the encasement compound into the upper interior space and a corresponding position or movement of the housing for self-leveling of the encasement compound can also be performed by applying the encasement compound to a top side of the circuit board by a nozzle that is controlled for example by a machine or by a robotic arm.

Then it is possible to only encase particular surface portions on a top side of the circuit board in a controlled manner, for example the fill in opening and/or an additional pass through opening between the upper and the lower interior space are not covered with the encasement compound or to not cover intended electronic components on the circuit board with the encasement compound for example to improve their heat dissipation or to facilitate their thermal expansion.

In this case removing the plugs can already be performed before introducing the encasement compound into the upper interior space in that the pass through openings provided after removing the plugs are not covered with the encasement compound from the upper interior space.

In order to control the time based viscosity of the encasement compound after application to the sensor and thus it's curing process during filling The liquid or pasty encasement compound has a predetermined viscosity and/or A predetermined encasement compound temperature and/or A predetermined housing temperature and/or The filling and in particular subsequent adherence occurs at a predetermined ambient temperature about the housing.

For example the encasement compound is introduced with a viscosity of six Pas to nine Pas, better 7 Pas to 8 Pas, when the encasement compound temperature during introduction is between 15° C. and 25° C., better between 19° C. and 21° C. and/or the ambient temperature during introduction is between 15° C. and 25° C., better between 19° C. and 21° C.

Also the determination of individual time periods during which the housing is retained in a particular position for making the encasement compound adhere is predetermined as a function of the type of encasement compound or its viscosity during introduction and/or the encasement compound temperature during introduction and/or the ambient temperature during introduction and by the same token in case of centrifugal encasement the centrifugation time period during which the housing is rotated or spun in order to make the encasement compound adhere in the lower interior space, advantageously continuously rotated or spun.

In case the soldering pads or the other attachment options for the electrical strands leading away from the circuit board terminate on a side that is opposite to the cable outlet, in particular the top side of the circuit board the electrical strands, in particular before applying and fixating the circuit board on the contact surface of the housing have to be run through a pass through opening, in particular the subsequent connection opening between the upper interior space and the lower interior space since typically the cable pass through or the plug connector for connecting the strands are in the lower interior space which typically has a greater height than the upper interior space.

Advantageously before encasement the interior surface of the housing and/or the circuit board that is stuffed with components is cleaned or surface treated so that the encasement compound can adhere to the surfaces quickly and permanently.

With respect to the component, in particular the sensor the object is achieved for a sensor of this type with pot shaped housing, a cover closing the housing and a circuit board arranged in an interior space of the housing on a contact surface that is offset from the base so that in a cured condition of the encasement compound the upper interior space and also the lower interior space are not completely filled by the encasement compound and in particular in the lower and/or upper interior space and interior cavity is provided which amounts to at least 20%, better at least 30%, better at least 40%, better at least 50%, better at least 60%, better at least 70% of the volume of the respective interior space.

In spite of that in the upper interior space and also in the lower interior space all desired portions, advantageously besides the upper interior surfaces of the housing in the upper interior space, advantageously all electrically conductive components and advantageously the entire top side of the circuit board shall be completely covered with the cured encasement compound, advantageously including the transition of the top side of the circuit board to the insides of the walls of the pot shaped housing. Individual elements that are not provided for encasement but which are still electrically conductive like e.g. a particular electrical component on the circuit board can be exempt from encasement.

Advantageously the interior circumferential walls of the lower interior cavity are completely covered with the encasement compound and in particular no electrically conductive components or elements protrude into the lower interior space beyond the interior surfaces of the hardened encasement compound that are not completely covered by the encasement compound.

In case a cable is run for signal transmission through a pass through opening in the housing in particular a gap between an outer circumference of the cable and the interior circumference of the pass through is completely covered by the encasement compound at least at its end that is oriented towards an interior of the housing.

Advantageously in the interior of the housing, in particular in the individual strands a longitudinal water barrier is arranged.

The upper cavity in the upper interior space is formed on the one hand side by the surface of the hardened encasement compound of the circuit board oriented towards the cover on the other hand side by the bottom side of the cover and the cover can be laterally defined by the interior surfaces of the wall of the pot shaped housing.

By the same token the fill in opening and/or the connection opening can be a gap between an outer circumference of the circuit board and the interior circumference of the interior space of the housing.

Advantageously at least one connection opening is provided between the lower interior space and the upper interior space in order to facilitate a pressure, temperature and/or liquid exchange between the upper cavity and the lower cavity.

The connection opening can be the fill in opening or the fill in opening that is still open represents a second connection opening.

Advantageously the fill in opening extends through the circuit board and/or the circuit board has a non-circular outer circumference and the interior circumference of the wall of the pot shaped housing is analogously non-circular in the portion for the contact surface for the circuit board which forms a form locking rotation safety between the circuit board and the housing.

The circuit board is placed at a distance from the base of the pot shaped housing in that the circuit board either contacts a face of an intermediary pot that is open in upward direction wherein the intermediary pot contacts the interior space of the pot shaped housing, in particular contacts its base or at other spacers relative to the base, for example a spacer ring.

The circuit board however can also contact the insides of the wall of the housing at a shoulder advantageously extending over the entire circumference.

In order to prevent the circuit board already before encasement of the sensor from a lift off from the contact surface the circuit board is fixated relative to the contact surfaces, advantageously glued down.

c) Embodiments

Figure 1B:
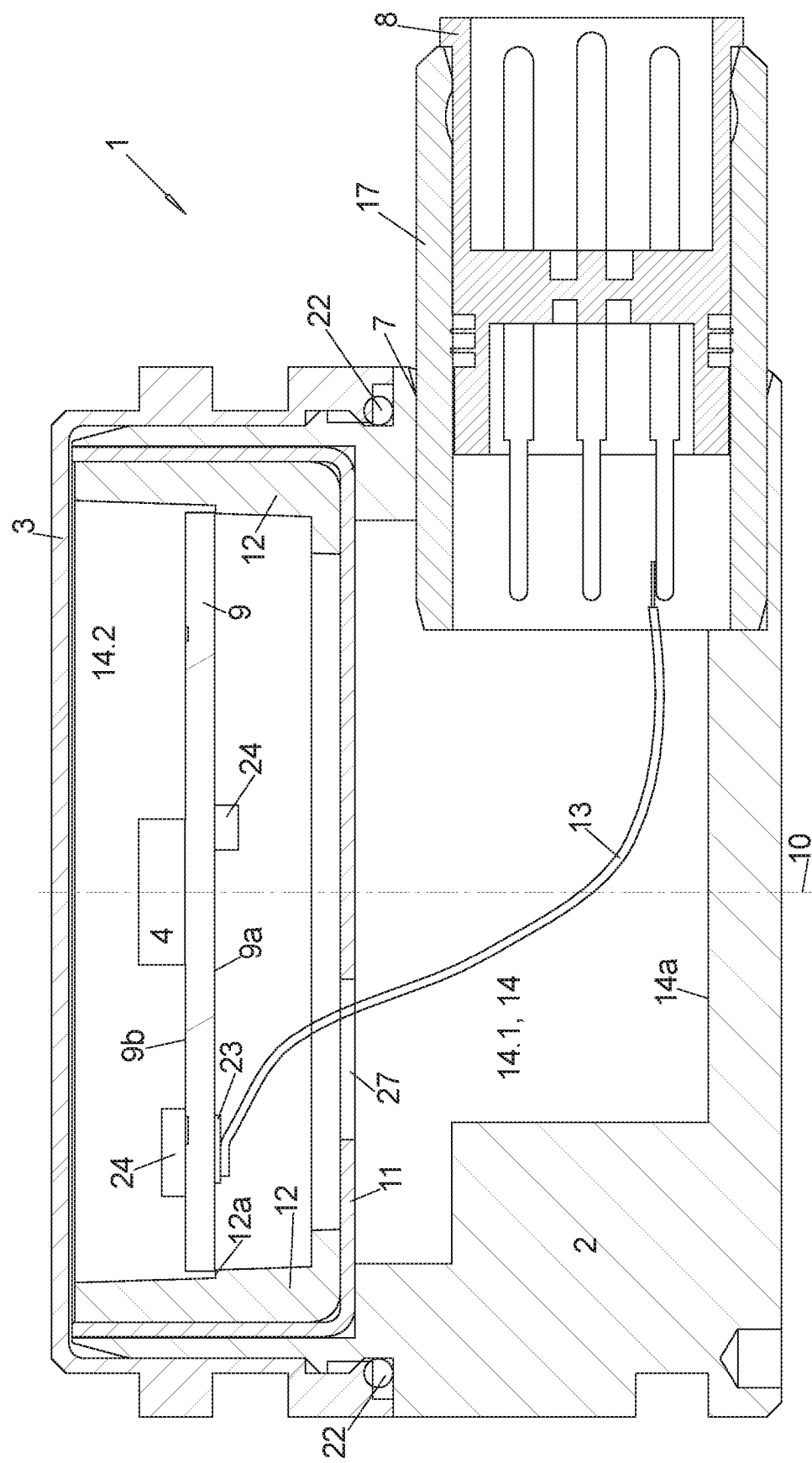
Figure 2A:
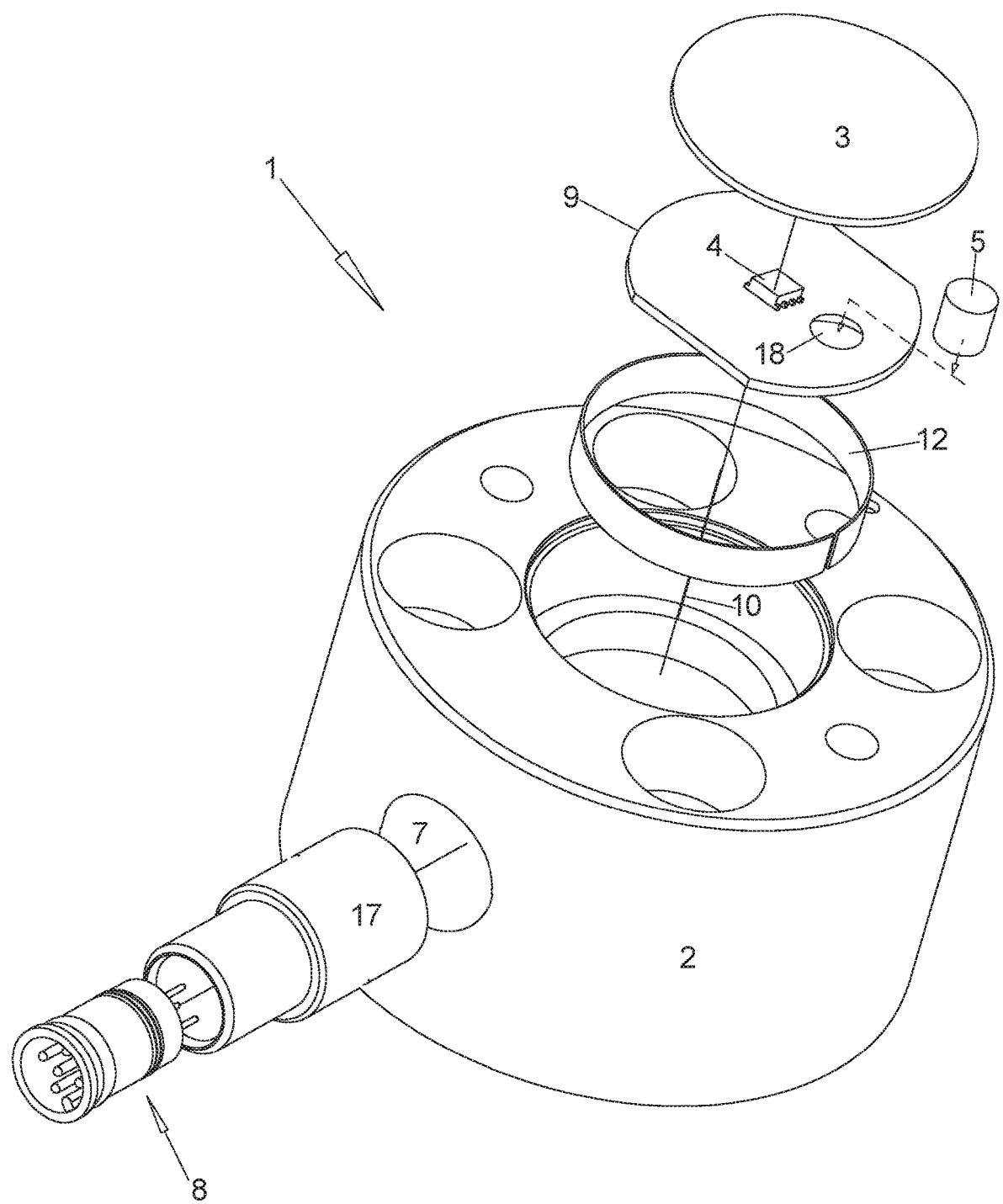
Figure 2B:
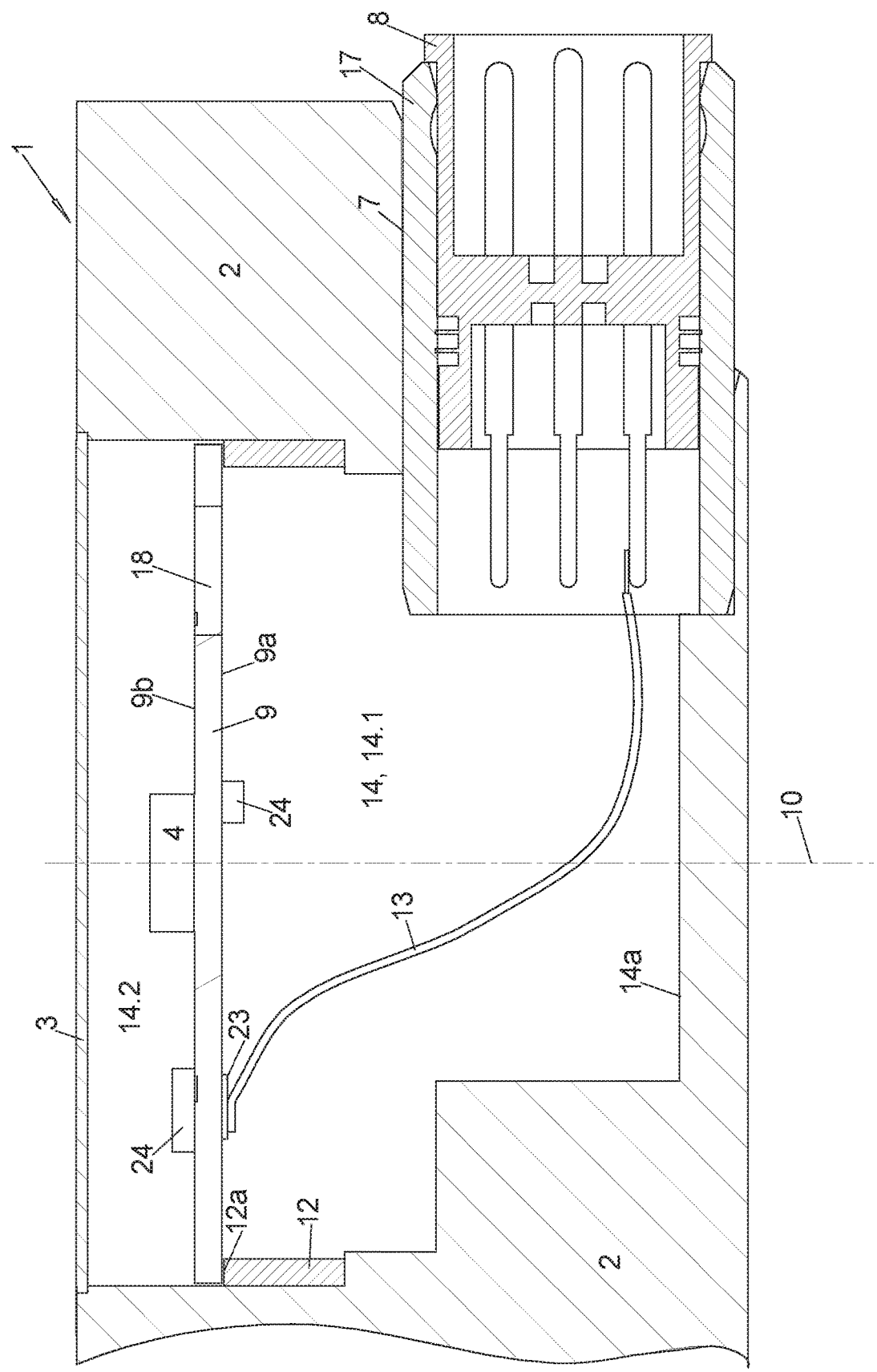

Embodiments of the invention are subsequently described in more detail in drawing figures, wherein:

FIG. 1*a* illustrates a first embodiment of the sensor in a perspective exploded view;

FIG. 1*b* illustrates the sensor in an assembled condition in an axial sectional view;

FIG. 2*a* illustrates a second embodiment of the sensor according to the invention in a perspective exploded view;

FIG. 2*b* illustrates the sensor of FIG. 2*a* in an assembled condition in an axial sectional view like in FIG. 1*b* for increased clarity without the encasement compound; and FIGS. 3*a-h* illustrate various conditions during assembly and encasement of the sensor of FIG. 2*a* plus 2*b* in the same axial sectional view as in FIG. 2*b*.

As illustrated in FIGS. 1*a, b* as first embodiment the first embodiment of the sensor 1 is made from a pot shaped housing 2 that is open on top and which has a rotation symmetrical, circular outer and interior contour besides the intermediary bushing 17 protruding at a location of the outer circumference wherein the intermediary bushing 17 includes a plug connector 8 and protrudes into a transversal bore hole of the side wall of the pot shaped housing 2 slightly above its base and through which signals determined by the sensor can be transmitted outward electrically.

In the assembled condition the plug socket 8 is seated tight in the intermediary sleeve 17 and the intermediary sleeve 17 is in turn seated tight in the cable pass through 7 of the side wall. At an inward protruding shoulder of the interior wall of the housing 2 which is slightly above the cable pass through 7 an intermediary pot 11 is arranged that is also pot shaped an open in upward direction which is advantageously made from soft iron material in order to shield the sensor element 4 in case it is a magnetic field sensitive sensor element from a magnetic field that impacts from the back side, thus from below upon the sensor element 4.

In the interior space of the intermediary pot 11 an annular spacer ring 12 is arranged on a base of the intermediary pot, wherein the spacer ring is typically made from a plastic material and which includes a shoulder protruding from an inside of the wall and serving as a contact surface 12*a* wherein an electronic circuit board 9 rests on the spacer ring and is advantageously glued thereto.

On a top side 9*b* of the circuit board 9 which top side is oriented towards the opening of the pot shaped housing 2 the sensor element 4 is approximately arranged in the center, thus an electronic chip. Additional electronic components 24 which typically form an element of a processing circuit for the signals of the sensor element 4 are arranged on the top side 9*b* and also on the bottom side 9*a* of the circuit boards 9.

A lug 25 furthermore protrudes inward from the interior circumference of the spacer ring 12 into a corresponding recess 26 in the outer circumference of the circuit board 9 and acts as a safety against relative rotation.

Soldering pads 23 are arranged on a bottom side 9a of the circuit board 9 wherein an electrically conductive strand 13 is attached with one end at a soldering pad wherein another end of the strand is soldered together respectively with one of the pins of the plug connector 8 oriented into the interior space 14 of the housing 2 and wherein only one single strand 13 is illustrated in an exemplary manner in FIG. 1b. Thus the strands 13 run through the base of the intermediary pot 11 through a pass through 27.

It is further evident from FIG. 1a that the printed circuit board has a circular outer contour over a large portion of its circumference wherein the circular outer contour fits precisely into the spacer ring 12 and also contacts an annular circumferential shoulder of the spacer ring 12 with this circular circumferential portion.

However, the circular outer contour of the circuit board 9 is flattened in a circumferential segment and in this portion an axially continuous gap is provided between the flattened portion of the circuit board 9 and the wall of the spacer ring 12.

In order to be able to close this gap as required and subsequently described with reference to FIG. 3, a plug 5 is being used during production of the sensor 1 which plug fits into the gap.

The housing 2 is closed in this case by a cap shaped cover 3 configured as a screw cover with an internal thread which can be screwed tight with a circumferential seal 22 like e.g. an O-ring arranged there between onto a respective external thread in an upper portion of the wall of the housing 2, thus above the cable pass through 7.

The second embodiment of the sensor 1 according to FIG. 2a, b differs from the first embodiment initially in that the wall thickness of the also pot shaped housing 2 is much greater thus large enough so that pass through bore holes can be applied axially extending therein which are useable for bolting the sensor 1 to an adjacent component.

Another essential difference is provided in that the cover 3 in this case is no cap shaped cover, but a circular plate shaped cover 3 which is inserted into a corresponding shoulder at the opening of the pot shaped housing 2 and for example welded and whose top side is aligned with the top side of the circumferential side wall of the housing 2.

Accordingly the outside of the wall of the housing 2 does not have an external thread but is cylindrical and smooth.

The next essential difference is that the second embodiment lacks an intermediary pot and merely a spacer ring 12 is provided.

In FIGS. 2a, b a bottom side of the spacer ring contacts a corresponding inward protruding shoulder of the interior wall surface of the housing 2 and an upper face of the spacer ring contacts a circular electronic circuit board 9 that precisely fits into the interior circumference of the housing 2.

In this circuit board 9 there is a fill in opening 18 whose purpose is illustrated based on FIG. 3a-g and which can be closed during production of the sensor 1 temporarily by an appropriately configured plug 5 which is advantageously also configured conical in the axial direction 10 like in the first embodiment.

In the instant case of FIG. 2a, b the fill in opening 18 is circular and also the plug 5 has a circular cross section.

Based on the sectional views FIGS. 3a-g of the second embodiment the manufacturing process of the sensor is described.

Figure 3A:
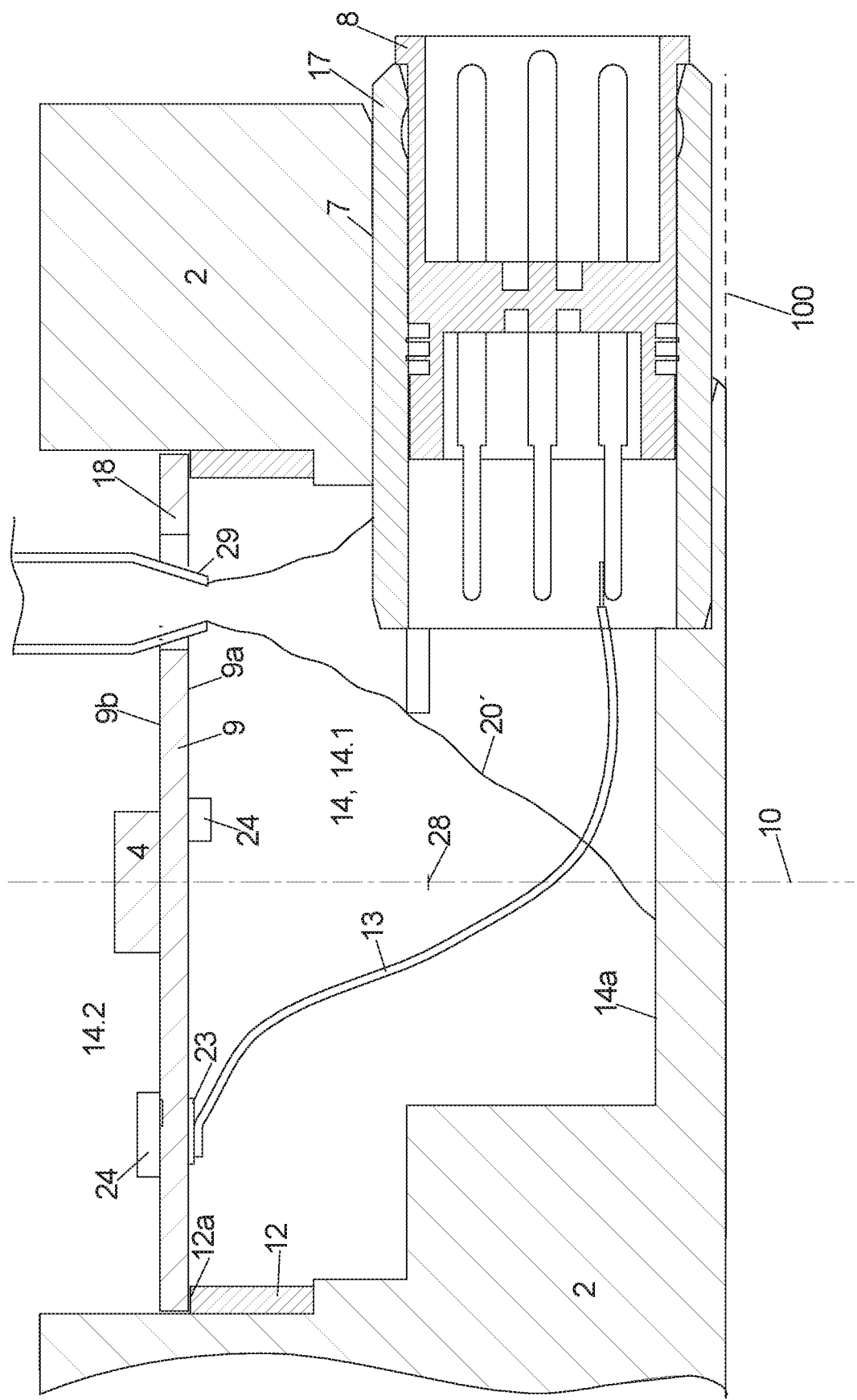

FIG. 3a illustrates a condition after all strands 13 are soldered on the one hand side together with the contact pins of the plug connectors 8 that are already mounted tight in the housing 2 that is still open on top at one end and with the soldering pads 23 at the bottom side 9a of the circuit board 9 on the other hand side and subsequently the circuit board 9 is applied with an edge portion of its bottom side 9a onto an upper face side of the spacer ring 12 and glued together therewith as well as the spacer ring 12 itself was glued to an interior circumferential wall of the housing 2.

In this condition according to FIG. 3a liquid or highly viscous not yet hardened but useable encasement compound 20' is filled through a fill in nozzle 29 inserted into the fill in opening 18 of the circuit board 9 into the lower interior space 14.1. It is evident that the fill in nozzle 29 does not completely close the fill in opening 18 during filling so that air displaced from the lower interior space 14.1 can exit in upward direction through the free portion of the fill in opening 18 adjacent thereto.

The lower interior space 14.1 is defined by a bottom side 9a of the circuit board on the one hand side and circumferential walls and the base 14a of the housing 2 and the plug connector 8 on the other hand side. Thus the housing 2 is in a horizontal position so that the upper opening of the housing 2 and/or the flat base 14a of the housing 2 that is typically parallel thereto extends approximately parallel to the horizontal plane 100.

The volume of filled in encasement compound 20' is visibly smaller than the volume of the lower interior space 14.1 so that the filled in encasement compound 20' would distribute over the base 14a with an even layer thickness.

However, it is advantageous according to FIG. 3b to pivot the housing 2 directly after filling in the encasement compound 20' into a first adhesion position in which the encasement compound 20' must not reach the fill in opening 18, namely pivot the housing about a pivot axis 28 extending in a viewing direction of FIG. 3a wherein the pivot axis 28 extends transversal to the axial direction 10 and also transversal to the extension of the plug connector 8 and the intermediary sleeve 17. Thus, the pivot direction is elected so that the plug connector 8 is rotated downward and in this first adhesion position the entire inward oriented face of the plug connector 8 with all contact pins is covered with the encasement compound 20'. In this first initial hardening condition the encasement compound 20' adheres thereto over a first time period.

Then according to FIG. 3c the housing 2 is rotated e.g. about the pivot axis 28 by for example 180° into a second initial hardening position so that the remaining interior circumferential surfaces the lower interior space 14.1 are wetted by not yet adhering liquid or highly viscous portion of the encasement compound 20'.

Before that, however as illustrated in FIG. 3b, c the fill in opening 18 is closed by the illustrated plug 5 which is inserted tight into the fill in opening 18 from the upper interior space 14.2 and protrudes in upward direction from the fill in opening 18.

The sensor 1 remains in this second adhesion position for a second time period until the encasement compound 20' filled into the lower interior space 14.1 adheres the circumferential walls strong enough so that subsequent position changes do not lead to any disengagement of the encasement compound 20' arranged proximal to the circumferential wall and adhering thereto.

This way thereafter all interior circumferential surfaces of the lower interior space 14.1 including the inward protruding lower end of the plug 5 are covered with encasement compound which now encloses a lower cavity 21.1 as evident in FIG. 3c.

When this is not safely achieved for example because the inserted volume of encasement compound 20' is too small for this purpose a rotation from the first adhesion position into the second adhesion position can also be less than 180°, for example only 120° and after the second time period has elapsed it can be rotated in the second adhesion position by an additional angular amount into the third adhesion position in which the housing 2 is then supported for a third time period.

For the encasement in the upper interior space 14.2 initially the housing 2 is moved into a horizontal position about the pivot axis 28 and in this refill position with the plug 5 still inserted into the fill in opening 18 a defined amount of liquid or highly viscous encasement compound 20' is filled into the upper interior space 14.2, advantageously poured in, wherein the encasement compound 20' self distributes and self-levels at this location. When the volume of the encasement compound 20' suffices electronic components 24 including the sensor element 4 on a top side 9b of the circuit board 9 and also adheres to the interior circumferential walls of the housing 2 above the top side 9b of the circuit board 9.

When there is a distance between the outer circumference of the circuit board 9 and the interior circumference of the housing 2 the encasement compound 20' depending on viscosity will also penetrate into the gap and adhere thereto.

Also here the volume of the filled in encasement compound 20' is smaller than the volume of the upper interior space 14.1 between the upper opening of the housing 2 down to the circuit board 9.

Figure 3D:
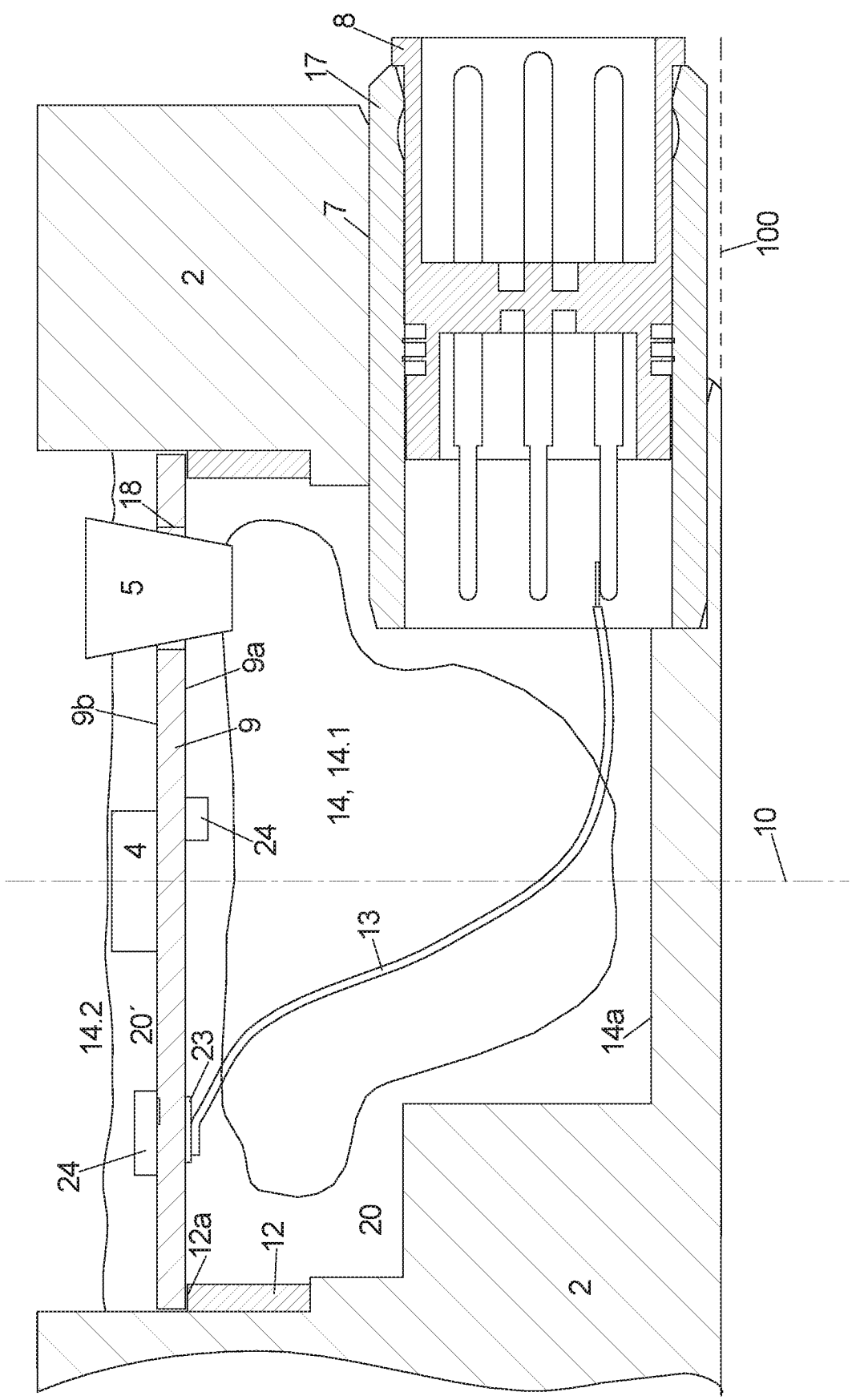

In another adhesion position which advantageously corresponds to the refill position according to FIG. 3d the encasement compound 20' adheres after a corresponding additional time period to the wetted surfaces between the surface of the e encasement compound 20' that is cured in the upper interior space and the free opening of the housing 2 an upper cavity 21.2 is created.

During the entire encasing process of the upper interior space 14.2 the encasement compound shall not reach the upper edge of the upper interior space 14.2 and/or also the top side of the plug 5 shall not be wetted.

Subsequently according to FIG. 3e1 the plug 5 is removed from the fill in opening 18 which provides a connection opening 19 between the lower cavity 21.1 and the upper cavity 21.2 which facilitates a gas exchange and pressure exchange between the two cavities 21.1 and 21.2.

When removing the plug 5, the plug 5 should be advantageously rotated about its axial direction before it is pulled out in the axial direction in order to tear off encasement compound adhering to its circumference, in particular in the lower interior space 14.1, advantageously not ye completely hardened encasement compound 20.

Therefore advantageously encasing the upper interior cavity 14.2 is performed directly after terminating adhesion in the second hardening position according to FIG. 3c and advantageously removing the plug 5 is performed in turn immediately after sufficient curing of the encasement compound in the upper interior space 14.2, so that there is no risk that neither the encasement compound 20 in the upper interior space 14.2 nor the encasement compound in the lower interior space 14.2 could close the opened connection opening 19 again.

Now the cover 3 can be applied according to FIG. 3f and can be connected tight with the housing 2.

FIG. 3e2 illustrates an alternative method for encasing in the upper interior space 14.2 compared to the method according to FIG. 3e1.

According to FIG. 3e2 the plug 5 is removed already before applying encasement compound 20' onto the top side 9b of the circuit board 9 thus into the upper interior space 14.2 which has the advantage that it can be examined whether removing the plug 5 actually causes an open connection opening 19 towards the lower cavity 21.

Thus thereafter according to FIG. 3e2 a defined volume of liquid or highly viscous encasement compound 20' is applied to the top side 9b of the circuit board 9 however not by casting and subsequent self-leveling but by dispensing with a encasement nozzle 29 that is moveable in a controlled manner along the top side 9b of the circuit board 9 and at a distance there above wherein the encasement nozzle only dispenses encasement compound 20' on selected surface portion of the top side 9b of the circuit board 9 with a small layer thickness so that lateral run out of the dispensed encasement compound 20' can be computed in advance as a function of viscosity and other environmental parameters like e.g. temperature.

It is appreciated that an encasement nozzle according to the instant application is any outlet opening for the encasement compound 20' irrespective of a typical nozzle effect namely acceleration of the flowing medium due to a cross section contraction towards the end of the nozzle occurs or not.

This way only predetermined portion on the surface of the circuit board 9 can be wetted by the encasement compound 20' as illustrated in FIG. 3e3 and also after curing predetermined portions that are not to be encased are exempt, for example the connection opening 19 or also a particular electronic component 24 on a top side 9b of the circuit board 9.

For example when a component 24 is a temperature sensor the temperature sensor shall not be covered by encasement compound 20 since conducting ambient temperature to a temperature sensor of this type is not only retarded but due to the good heat conductivity of the encasement compound the measuring result would be falsified in general.

| REFERENCE NUMERALS AND DESIGNATIONS | |
|---|---|
| 1 | sensor |
| 2 | housing |
| 2' | housing opening |
| 2a | base |
| 3 | cover |
| 4 | sensor element |
| 5, 5' | plug |
| 6 | shoulder |
| 7 | cable pass through |
| 8 | plug connector |
| 9 | circuit board |
| 9a | bottom side |
| 9b | top side |
| 10 | axial direction |
| 11 | intermediary pot |
| 12 | spacer, spacer ring |
| 12a | contact surface |
| 13 | strand |
| 14 | interior space |
| 14a | base |
| 14.1 | lower interior space |
| 14.2 | upper interior space |
| 15 | pivot axis |
| 16 | layer thickness |
| 17 | intermediary bushing |
| 18 | fill in opening |
| 19 | connection opening |
| 20, 20' | encasement compound |
| 21.1 | lower cavity |

-continued

| | REFERENCE NUMERALS AND DESIGNATIONS |
|---|---|
| 21.2 | upper cavity |
| 22 | seal |
| 23 | soldering pad |
| 24 | electronic component |
| 25 | lug |
| 26 | recess |
| 27 | pass through |
| 28 | pivot axis |
| 29 | encasement nozzle |
| 100 | horizontal plane |

The invention claimed is:

1. A method for producing an electrical component (1) with a housing and an encased electronic circuit board included therein, comprising:
a pot shaped housing (2) with a face side housing opening (2'),
a circuit board (9) with a sensor element arranged thereon, wherein the circuit board (9) is arranged at a distance on one side from a base (14a) of an interior space (14) of the pot shaped housing (2) and on other side from a bottom side (3a) of the cover (3) an open side of the pot shaped housing, wherein the interior space (14) comprises a lower interior space (14.1) and an upper interior space (14.2);
wherein the lower interior space (14.1) is formed below the circuit board (9) and the upper interior space (14.2) is formed above the circuit board (9) in the housing (2) wherein the lower interior space (14,1) and the upper interior space (14,2) are connected with each other through a fill in opening (18); wherein the method comprises the steps of:
a) the circuit board (9) is electrically connected to ends of electrical strands (13) leading away from the circuit board (9) and the circuit board (9) is applied to a contact surface (12a) in the interior space (14) of the housing (2) and secured at least against an axial lift off from the contact surface;
b) a liquid or highly viscous encasement compound (20') is filled into the interior space of the housing (2) which includes the circuit board (9), and wherein step b) includes the following steps in sequence:
b 1) the housing (2) is supported in the fill-in position with the lower interior space (14.1) arranged at least partially below the fill in opening (18) of the circuit board (9),
b2) in this fill-in position the liquid or highly viscous encasement compound (20') is introduced through the fill-in opening (18) past the circuit board (9) or through the circuit board into the lower interior space (14.1) with a volume which is smaller than the volume of the lower interior space (14.1) and the housing (2) is supported in this fill in position as a first adhesion position in which the encasement compound (20') does not reach the fill in opening (18) over a predetermined first time period,
b3) the housing (2) is rotated about a non-vertical pivot axis (15) until it is advantageously oriented downward with its open side and the housing (2) is supported in this second adhesion position for a predetermined second time period, and
b4) the housing (2) is moved into a refill position in which the lowest point of the housing opening (2') is higher than the highest point of the circuit board (9),
b5) in this refill position liquid or highly viscous not yet hardened encasement compound (20') is applied into the upper interior space (14.2) on the top side (9b) of the circuit board (9) with a volume which is smaller than the volume of the upper interior space (14.2), and
b6) complete hardening of the encasement compound (20') over a third time period in a third adhesion position in particular the refill position is performed.

2. The method according to claim 1,
including the additional step
b2.1) after b2), immediately thereafter the fill in opening (18) is closed by a plug (5) and also an additionally provided connection opening (19) between the lower interior space (14.1) and the upper interior space (14.2) is closed by an additional plug (5').

3. The method according to claim 1, including the additional step after b3) at least one plug (5) is removed again either in a step b7) after b6) if in b5+b6) the encasement compound (20') is applied to also cover the fill in opening (18) or an additionally provided connection opening (19) and is hardened,
or in a step b4.1) before b5) when b5+6) includes applying and adhering the encasement compound (20') about the fill-in opening or an additionally provided connection opening (19).

4. The method according to claim 1, wherein
filling the liquid or highly viscous encasement compound (20') into the lower or upper interior space (14.1, 14.2) is performed at a predetermined encasement compound temperature or a predetermined ambient temperature, or
a volume of encasement compound filled into the upper or lower space is more than 40% of the volume of respectively the upper space or the lower space.

5. The method according to claim 1, wherein predetermining the first time period or the second time period is performed as a function of a type of the encasement compound (20, 20') or its viscosity or the encasement compound temperature or the ambient temperature during the time period.

6. The method according to claim 1, wherein the encasement compound (20') is introduced with a viscosity of 6 Pas to 9 Pas, at an encasement compound temperature of 15° C.-25° C. or a predetermined ambient temperature of 15° C.-25° C.

7. The method according to claim 1, wherein in case the strands (13) terminate on the top side (9b) of the circuit board (9), the strands (13) are run before step a) through a pass through opening between the upper interior space (14.2) and the lower interior space (14.1) into the upper interior space (14.1) if the cable pass through (7) or the plug connector (8) in the housing (2) are in the lower interior space (14.1).

8. The method according to claim 1, wherein before step b) at least interior surfaces of the housing (2) or the stuffed circuit board (9) are cleaned or surface treated.

9. The method according to claim 1,
wherein the method comprises the additional step of:
c) a cover (3) is placed tight onto the open side of the pot shaped housing (2) to close the open side of the pot shaped housing (2).

10. A component comprising:
a pot shaped housing (2) with a face side housing opening (2'),
a circuit board (9) with a sensor element (4) arranged thereon, a cover (3) closing an open side of the pot shaped housing (2),
wherein the circuit board (9) is arranged on a contact surface (12a) at a distance on one side from a base (14a) of an interior space (14) and on the other side from the open side of the pot shaped housing, wherein the interior space comprises a lower interior space (14.1) and an upper interior space (14.2), wherein
the lower interior space (14.1) of the interior space (14) is arranged below the circuit board (9) and the upper interior space (14.2) of the interior space (14) is formed above the circuit board (9),
wherein both at least one of the interior spaces (14.1, 14.2) are partially filled with a liquid or highly viscous encasement compound (20'),
wherein a hardened encasement compound (20) in the upper interior space (14.2) covers at least all electrically conductive components and portions on a top side (9b) of the circuit board (9),
a cured encasement compound (20) in the lower interior space (14.1) covers all electrically conductive components;
a lower cavity (21.1) inside the cured encasement compound (20) filled with either nothing or gas is provided in the lower interior space (14.1) and covered at least either partially or fully by the cured encasement compound (20), wherein in the lower cavity (21.1) there is no encasement compound (20), and
an upper cavity (21.2) between the cover and the hardened encasement compound filled with either nothing or gas is provided in the upper interior space (14.2) which is either partially or fully covered by the hardened encasement compound (20),
wherein in the upper cavity (21,1) there is no hardened encasement compound (20),
wherein the lower interior space (14.1) is covered with the cured encasement compound (20) fully circumferentially along all its walls and a ceiling and a base of the lower interior space (14.1) is covered with the cured encasement compound.

11. The component according to claim 10, wherein
a connection opening (19) is arranged between the lower cavity (21.1) and the upper cavity (21.2).

12. The component according to claim 10, wherein
a volume of the lower cavity (21.1) is at least 20% of the volume of the lower interior space (14.1).

13. The component according to claim 10, wherein
a volume of the upper cavity (21.2) is at least 20% of the volume of the upper interior space (14.2).

14. The component according to claim 10, wherein
a layer thickness (16) of the encasement compound (20) on a top side (9b) of the circuit board (9) is between 1 mm and 2 mm.

15. The component according to claim 10, wherein
the circuit board (9) has a fill in opening (18) for filling liquid or highly viscous not yet hardened encasement compound (20') into the lower interior cavity (14.1).

16. The component according to claim 10, wherein
the encasement compound (20) adheres in the upper interior space (14.2) to insides of the wall of the pot shaped housing (2).

17. The component according to claim 10, wherein
the circuit board (9) contacts either a face of an upward open intermediary pot (11) which contacts the interior space (14) of the pot shaped housing (2) as a spacer (12),
or the circuit board (9) contacts a shoulder (6) functioning as a contact surface (12a) and protruding in an inward direction at insides of the walls of the housing (2),
or the circuit board (9) contacts a contact surface (12a) on a top side of at least one separate spacer (12).

18. The component according to claim 10, wherein
the circuit board (9) has a non-circular outer circumference and in the contact portion of (12a) the interior space (14) of the housing (2) and
either the fill in opening (18) or the connection opening (19) is a gap between the outer circumference of the circuit board (9) and an interior circumference of the interior space (14),
or the contact surface of the intermediary pot (13) has an analogously non-circular interior contour and functions as a rotation safety.

19. A method for producing a component, wherein the component comprising:
a pot shaped housing (2) with a face side housing opening (2'),
a circuit board (9) with a sensor element (4) arranged thereon,
wherein the circuit board (9) is arranged on a contact surface (12a) at a distance on one side from a base (14a) of an interior space (14) and on other side from an open side of the pot shaped housing,
wherein the interior space comprises a lower interior space (14.1) and an upper interior space (14,2),
wherein the lower interior space (14.1) of the interior space (14) is arranged below the circuit board (9) and the upper interior space (14.2) of the interior space (14) is formed above the circuit board (9),
wherein at least one of the interior spaces (14.1, 14.2) is partially filled with a hardened encasement compound (20'),
wherein the method comprises the steps of:
a) the circuit board (9) is electrically connected to ends of electrical strands (13) leading away from the circuit board (9) and the circuit board (9) is applied to the contact surface (12a) in the interior space (14) of the housing (2) and secured at least against an axial lift off from the contact surface;
b) a liquid or highly viscous encasement compound (20') is filled into the interior space of the housing (2) which includes the circuit board (9), and wherein step b) includes the following steps in sequence:
b1) the housing (2) is supported in the fill-in position with the lower interior space (14.1) arranged at least partially below the fill in opening (18) of the circuit board (9),
b2) in this fill-in position the liquid or highly viscous encasement compound (20') is introduced through the fill-in opening (18) past the circuit board (9) or through the circuit board into the lower interior space (14.1) with a volume which is smaller than the volume of the lower interior space (14.1) and the housing (2) is supported in this fill in position as a first adhesion position in which the encasement compound (20') does not reach the fill in opening (18) over a predetermined first time period, b3) the housing (2) is rotated about a non-vertical pivot axis (15) until it is advantageously oriented downward with its open side and the housing (2) is supported in this second adhesion position for a predetermined second time period, and b4) the housing (2) is moved into a refill position in which the lowest point of the housing opening (2') is higher than the highest point of the circuit board (9), b5) in this refill position liquid or highly viscous not yet hardened encasement compound (20') is applied into the upper interior space (14.2) on the top side (9b) of the circuit board (9) with a volume which is smaller than the volume of the upper interior space (14.2), and b6) complete hardening of the encasement compound (20') over a third time period in a third adhesion position in particular the refill position is performed.

20. The method according to claim 19, wherein a cover (3) closes the open side of the pot shaped housing (2).

* * * * *